UNITED STATES PATENT OFFICE.

GEORGE DIEFFENBACH, OF NEW YORK, N. Y.

IMPROVEMENT IN PROCESSES FOR COLORING ARTIFICIAL TEETH.

Specification forming part of Letters Patent No. 24,545, dated June 28, 1859.

*To all whom it may concern:*

Be it known that I, GEORGE DIEFFENBACH, of the city, county, and State of New York, have invented a new method of coloring certain curable compounds applicable to the making of dental plates or bases and to other articles of manufacture; and I do hereby declare that the following is a full and exact description of my invention and of its application.

The nature of my invention consists in coloring a certain composition of matter, of which sulphate of alumina forms an indispensable ingredient, by incorporating the color into the composition while in its plastic or uncured state, and by developing the said color in the cured or hardened composition through the agency of solar light, as hereinafter described.

I deem it proper to state that I have made application for Letters Patent of the United States for the invention of a new and improved compound applicable to dental bases and to other articles of manufacture, which said application was duly filed in the Patent Office on the 15th day of February, 1859, and to which said application reference is hereby made for the purpose of a description of the compound or composition of matter. The coloring process of the said compound forms the subject-matter of this specification.

My attention was first drawn to the necessity of providing some means for giving color to compounds intended to represent artificial gums by the bad representation of flesh-color in the existing artificial gums. The compound termed "coralite" consists of gutta-percha, sulphur, and some coloring-matter. Another compound, termed "vulcanite," consists of india-rubber, sulphur, and coloring-matter; but the dental plates thereby produced are so imperfect in regard to their color that it is generally necessary to coat them with porcelain in the same manner as metallic gums are coated, by which their weight is greatly increased and their shape impaired. In the amber bases patented by me on the 13th day of April, 1858, a better representation of flesh-color may be achieved; but the color is not clear enough for an exact imitation of a healthy gum. Having ascertained the fact that the presence of sulphur in the said compositions was inimical to the preservation of color therein, I have succeeded in making an uncured compound consisting of sulphate of alumina and other ingredients, which said compound, as described and claimed in my application filed in the Patent Office, as aforesaid, is capable of developing and retaining the color incorporated into the same by the application of the process hereinafter described and claimed.

To enable others skilled in the art to make and use my invention, I will proceed to describe it.

For dental purposes I add to the compound, as described in my said application, a mixture of colors consisting of one ounce of sulphide of cadmium, (yellow,) about eight ounces of oxide of tin, (white,) about two ounces of vermilion, (red,) and about two drams of a preparation made by the following process: One part, by weight, of gold is dissolved in eighty parts of aqua regia, (consisting of muriatic and nitric acids,) and the liquid is then dried by evaporation. Water is then added in a sufficient quantity to dilute the mixture, and one hundred and sixty parts of pulverized feldspar is incorporated into and intermixed with the same. The whole mass is then put into a muffle. It is therein exposed to heat until the said mass becomes red-hot or annealed. It is left in that condition until all the acids are evaporated, when it is removed from the heat and pulverized. When these colors are ground and well mixed together they will represent the color of a healthy gum. When it is desired to give or impart any other color to the compound the coloring-matter to be incorporated into the compound is to be selected from mineral colors. The composition of matter thus made is then formed, shaped, and cured or hardened in the usual manner, or in the manner described in my patent of April 13, 1858, or in the manner described in my application filed February 15, 1859. When the curing or hardening process is completed the mineral colors incorporated into the compound, as aforesaid, will not be visible on the surface, but the cured compound will present the appearance of a dark hue. To develop the true color I put the cured compound in a glass vessel filled with pure alcohol or ether. I then close the said vessel by a tightly-fitting glass cover and expose the same to the rays of the sun during about one hour, when the former hue will be changed into that of the coloring-matter previously intermixed, and the color thus developed will permanently adhere to the surface, and will be removable by the application of mechanical forces only. This being the first instance known where the color of a composition is developed by the action of solar light, I deem it proper to state that it is not the heat of the sun which effects the development of color, for I have observed that during the coldest days the development is as easy and as perfect as during the warmest period of the year.

By the application of this coloring process I am enabled to represent any desired color in the cured or hardened compound described, and by its application to artificial gums, plates, bases, &c., these articles may be obtained of a homogeneous mass and a perfect color, excelling in these respects all existing dental plates.

What I claim as my invention, and desire to secure by Letters Patent, is—

Developing the color of a cured or hardened composition by the agency of solar light, when the coloring-matter is incorporated into the said composition while in its plastic or uncured state, substantially as described.

Dated New York, April 8, 1859.

GEORGE DIEFFENBACH.

Witnesses:
 CHARLES WEHLE,
 T. WEHLE.